United States Patent
Hohl et al.

(10) Patent No.: US 11,162,459 B2
(45) Date of Patent: Nov. 2, 2021

(54) DIRECT INJECTION GAS INJECTOR WITH AN ELASTOMER SEAL

(71) Applicant: Robert Bosch GmbH, Stuttgart (DE)

(72) Inventors: Guenther Hohl, Stuttgart (DE); Friedrich Moser, Magstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/529,549

(22) PCT Filed: Sep. 29, 2015

(86) PCT No.: PCT/EP2015/072300
§ 371 (c)(1),
(2) Date: May 25, 2017

(87) PCT Pub. No.: WO2016/082982
PCT Pub. Date: Jun. 2, 2016

(65) Prior Publication Data
US 2017/0306891 A1    Oct. 26, 2017

(30) Foreign Application Priority Data
Nov. 28, 2014   (DE) .......................... 102014224338.6

(51) Int. Cl.
*F02M 21/02*          (2006.01)
(52) U.S. Cl.
CPC .... *F02M 21/0269* (2013.01); *F02M 21/0275* (2013.01); *F02M 21/0281* (2013.01); *F02M 2200/9015* (2013.01); *Y02T 10/30* (2013.01)

(58) Field of Classification Search
CPC ........... F02M 21/0269; F02M 21/0281; F02M 21/0275
See application file for complete search history.

(56) References Cited

U.S. PATENT DOCUMENTS 8,069,842 B2 * 12/2011 Kannan ................. F02M 61/14
123/470
2007/0163545 A1    7/2007 Beardmore et al.
(Continued)

FOREIGN PATENT DOCUMENTS

| EP | 2385242 A2 | 11/2011 |
| FR | 2925612 A1 | 6/2009 |
| GB | 2115065 A | 9/1983 |

OTHER PUBLICATIONS

International Search Report dated Jan. 26, 2016, of the corresponding International Application PCT/EP2015/072300 filed Sep. 29, 2015.

*Primary Examiner* — Xiao En Mo
(74) *Attorney, Agent, or Firm* — Norton Rose Fulbright US LLP; Gerard Messina

(57) ABSTRACT

A gas injector for injecting a gaseous fuel directly into a combustion chamber of an internal combustion engine, having a valve closing element for releasing and closing a through-opening, a first seal seat between the valve closing element and a valve body, the first seal seat being a metallic seal seat having two metallic sealing partners, and having a second seal seat between the valve closing element and a stationary component, the second seal seat having at least one elastomer seal as sealing partner, the first seal seat being situated closer to the combustion chamber than is the second seal seat.

13 Claims, 3 Drawing Sheets

(56) References Cited

U.S. PATENT DOCUMENTS

| | | | |
|---|---|---|---|
| 2009/0050113 A1* | 2/2009 | Liskow | F02M 61/14 |
| | | | 123/470 |
| 2012/0104120 A1* | 5/2012 | Holt | F16F 1/328 |
| | | | 239/533.2 |
| 2014/0224903 A1* | 8/2014 | Fujino | F02M 51/0664 |
| | | | 239/585.1 |

* cited by examiner

DIRECT INJECTION GAS INJECTOR WITH AN ELASTOMER SEAL

FIELD

The present invention relates to a direct injection gas injector for injecting a gaseous fuel directly into a combustion chamber of an internal combustion engine, having an elastomer seal.

BACKGROUND INFORMATION

In addition to liquid fuels, gaseous fuels, such as natural gas or hydrogen, have recently also come into increasing use in motor vehicle technology. An area of problems in such gas injectors is the seal, in particular in the case of direct injection gas injectors situated immediately at the combustion chamber. Here a suitable seal material would be for example an elastomer, which however up to now has not been used for direct injection gas injectors due to its limited ability to withstand temperature and high susceptibility to wear. In addition to the good sealing properties of the elastomer, its outstanding damping properties during the closing process are also advantageous. It would therefore be desirable to have a direct injection gas injector in which elastomer seals can also be used.

SUMMARY

An example direct injection gas injector according to the present invention for injecting a gaseous fuel directly into a combustion chamber of an internal combustion engine may have the advantage that an elastomer seal can be used despite the high thermal loading due to the direct injection. According to the present invention, this is achieved in that a valve closing element for releasing and closing a through-opening has a first seal seat and a second seal seat. The first seal seat is provided between the valve closing element and a valve body, the first seal seat being a metallic seal seat having two metallic sealing partners. The second seal seat is provided between the valve closing element and a stationary component, the second seal seat having at least one elastomer seal. According to the present invention, here the first seal seat is situated closer to the combustion chamber than is the second seal seat. In this way, the second seal seat, including the elastomer material, can be situated at some distance from the combustion chamber, so that the temperature loading for the second seal seat is significantly less. In addition, the first seal seat, fashioned as a metallic seal seat, and the second seal seat, which includes the elastomer seal, can be separately optimized and designed for their respective intended uses.

Preferred developments of the present invention are described herein.

Preferably, the stationary component on which the second seal seat is provided is a guide component for guiding the valve closing element. In this way, a particularly compact design of the gas injector can be realized. In addition, through the guide element, a guiding of the valve closing element is possible. Alternatively, the stationary component on which the second seal seat is fashioned is the valve body on which the first seal seat is also provided.

Also preferably, a first diameter at the first seal seat is equal to or smaller than a second diameter at the second seal seat. Due to the use of the gaseous fuel, relatively large opening cross-sections must be provided during the opening of the gas injector in order to realize opening times that are as short as possible. So that the gas injector has a stroke that is as small as possible, according to the present invention a diameter of the first seal seat is equal to or smaller than a diameter of the second seal seat.

In order to provide a design that is as small as possible in the axial direction of the gas injector, the second seal seat is preferably a flat seat. The first seal seat is preferably a tapering seal seat, in particular a conical seal seat. Alternatively, the second seal seat can also be a tapering seal seat, e.g., a conical seal seat.

Further preferably, a distance between the first seal seat and the second seal seat in the axial direction of the gas injector is selected such that the first seal seat provides a stop for the second seal seat, which includes the elastomer seal. In this way, overloading of the elastomer seal during closing of the gas injector is prevented, in order to avoid damage to the elastomer seal.

According to a further preferred embodiment of the present invention, the gas injector additionally includes a cooling ring that is connected to the valve body and that is in contact with a cylinder head in which the gas injector is mounted. In this way, a thermal conduction can be enabled between the valve body and the cylinder head via the cooling ring.

The cooling ring is preferably made of a metallic material, in particular a soft metallic material. According to the present invention, in the present context a soft metallic material is understood as a metallic material that has not been hardened.

Further preferably, the cooling ring has a profile on an inner circumference and/or on an outer circumference, in particular a toothed profile. In this way, the cooling ring can be more easily deformed so that manufacturing tolerances that may be present can also be compensated. Alternatively, the cooling ring is preferably a wave spring, which is also capable of compensating tolerances that are present.

Particularly preferably, the cooling ring is fashioned as a ring having slits in the axial direction, which significantly facilitates mounting.

In addition, the present invention relates to an internal combustion engine including a combustion chamber and a gas injector according to the present invention, the gas injector being situated immediately on the combustion chamber in order to inject gaseous fuel directly into the combustion chamber.

BRIEF DESCRIPTION OF THE DRAWINGS

In the following, preferred exemplary embodiments of the present invention are described in detail with reference to the figures.

DETAILED DESCRIPTIONS OF EXAMPLE EMBODIMENTS

In the following, a gas injector 1 for injecting a gaseous fuel directly into a combustion chamber 9 of an internal combustion engine is described in detail with reference to FIG. 1.

Figure 1:
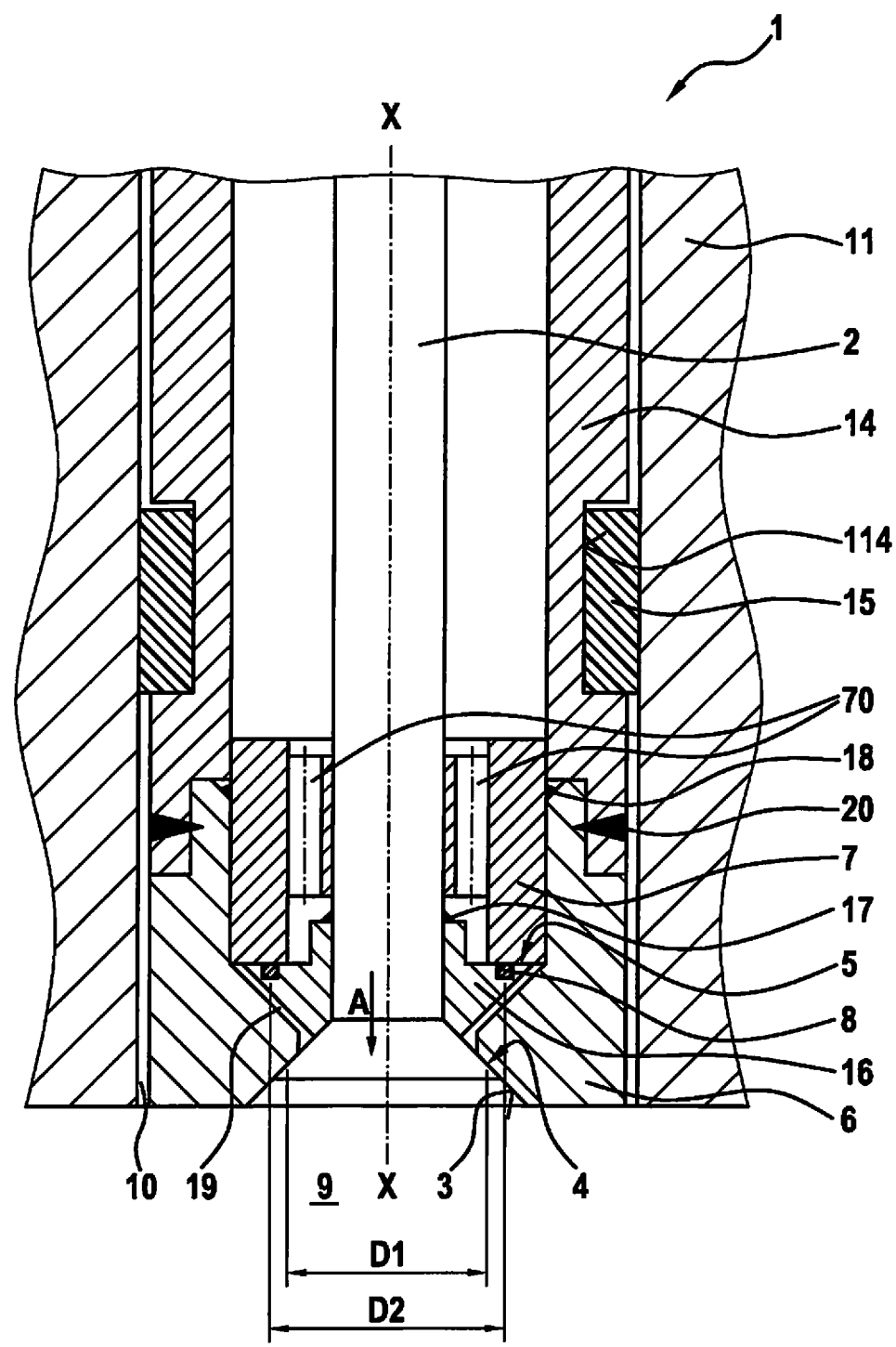
FIG. 1 shows a schematic sectional view of a gas injector according to a first exemplary embodiment of the present invention.

As can be seen in FIG. 1, gas injector 1 has a valve closing element 2, which in this exemplary embodiment is a valve needle. Valve closing element 2 releases a through-opening 3 and closes this opening. FIG. 1 shows the closed state of the gas injector, which is an injector that opens outwardly. Valve closing element 2 is actuated by an actuator (not shown), e.g. a piezoactuator or a magnetic actuator.

Gas injector 1 has a first seal seat 4 and a second seal seat 5. First seal seat 4 is a metallic seal seat, i.e. the two sealing partners are made of a metallic material. First seal seat 4 is provided here between valve closing element 2 and a valve body 6. Here, first seal seat 4 is a conical seal seat (cf. FIG. 1). Valve closing element 2 opens outwardly, which is indicated in FIG. 1 by arrow A.

Second seal seat 5 is situated further away from combustion chamber 9 than is first seal seat 4, in axial direction X-X of the gas injector (see FIG. 1). Second seal seat 5 includes an elastomer seal 8. Here, second seal seat 5 is formed between a seat bearer 16, fixedly connected to valve closing element 2, and a stationary component that is a guide component 7 for valve closing element 2. Here, elastomer seal 8 is situated in seal bearer 16 in a correspondingly formed groove in the seal bearer. It is to be noted that seal bearer 16 is connected fixedly to valve closing element 2 by a first weld connection 17. Instead of separate seat bearer 16, valve closing element 2 could also be fashioned in a corresponding geometric shape, which however would make valve closing element 2 significantly more expensive to produce.

Guide component 7 is fixedly connected to valve body 6 via a second weld connection 18. As a result, guide component 7 is also stationary, as is valve body 6. In guide component 7 a plurality of through-openings 70 are provided to conduct the fuel in the direction towards the tip of valve closing element 2.

Valve body 6 is connected to a valve sleeve 14 via a third weld connection 20. On valve sleeve 14, there is provided a recess 114 for accommodating a sealing ring 15 that seals between valve sleeve 14 and cylinder head 11. Sealing ring 15 is for example made of Teflon.

As is also shown in FIG. 1, between seat bearer 16 and valve body 6 an annular space 19 is provided. The volume of space 19 is selected to be as small as possible.

As is also shown in FIG. 1, a first diameter D1 of first seal seat 4 is smaller than is a second diameter D2 of second seal seat 5. In this way, gas injector 1 requires a smaller stroke for complete opening in order to release a predetermined opening cross-section.

In addition, first seal seat 4, fashioned as a metal-metal seal seat, is provided in such a way that first seal seat 4 provides a stop for elastomer seal 8, so that elastomer seal 8 is not overloaded during the closing of gas injector 1.

In the closed state, elastomer seal 8 on second seal seat 5, relative to guide component 7, thus seals the gaseous fuel securely relative to combustion chamber 9. Because the volume of space 19 is selected to be as small as possible, only a small quantity of gaseous fuel still situated in space 19 after the closing can enter into combustion chamber 9 through first seal seat 4, if this does not seal completely.

In this exemplary embodiment, second seal seat 5 is fashioned as a flat seat. In order to improve the flow properties, second seal seat 5 can however also be fashioned as a tapering seal seat, e.g. as a conical seal seat like first seal seat 4. A stop for the second seal seat can then be provided separately, for example on guide component 7.

According to the present invention, a thermal loading of second seal seat 5, and in particular of elastomer seal 8, is in this way significantly reduced, because second seal seat 5 is situated further away, in axial direction X-X, from combustion chamber 9 than is first seal seat 4. First seal seat 4 is fashioned as a metallic seal seat, and additionally protects second seal seat 5 from hot combustion chamber gases, even in the closed state. In addition, according to the present invention both first seal seat 4 and second seal seat 5 can be individually designed optimally with regard to demands that are made. At the same time, the gas injector according to the present invention can nonetheless be produced at very low cost.

Figure 2:
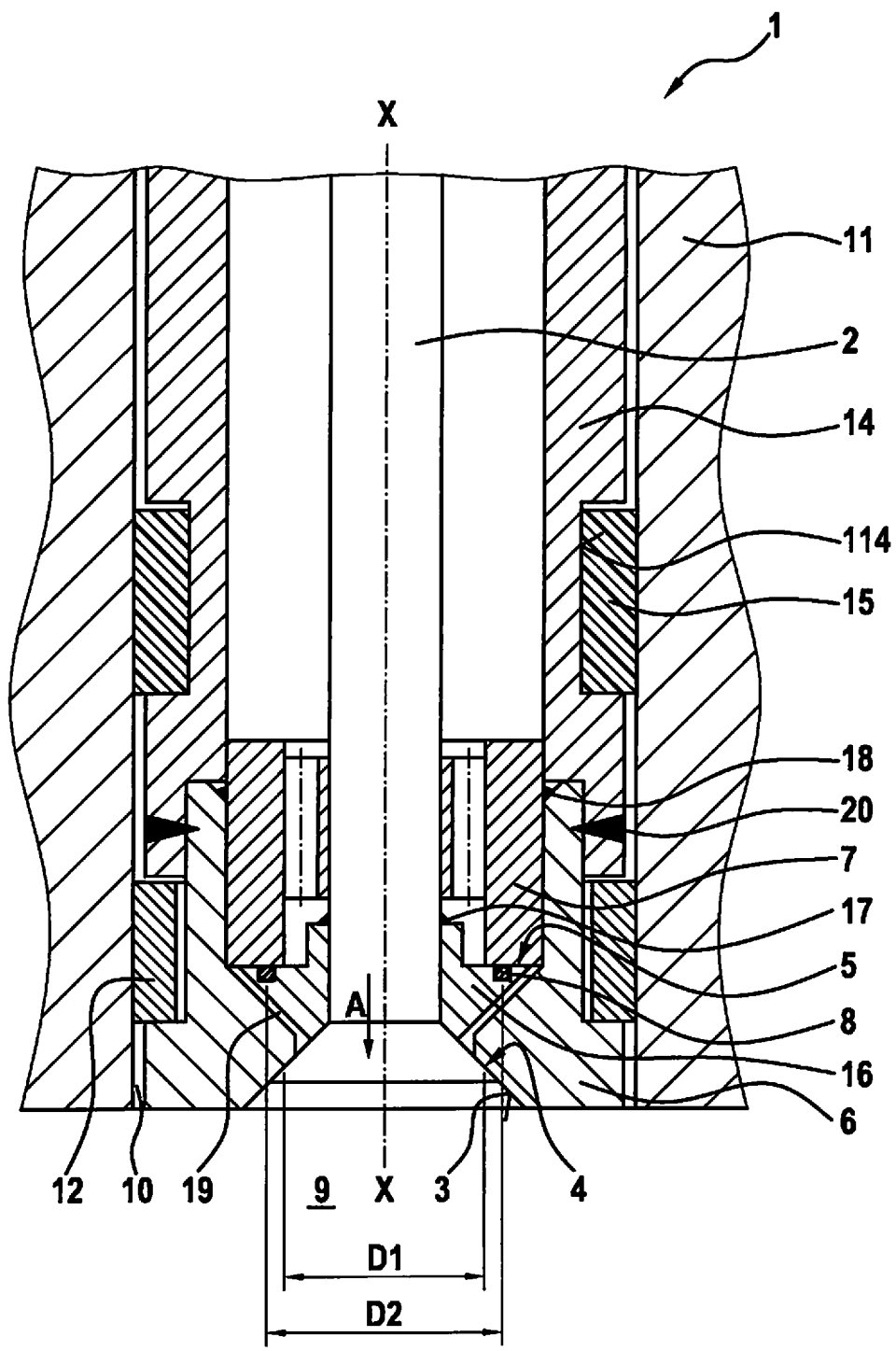
FIG. 2 shows a schematic sectional view of a gas injector according to a second exemplary embodiment of the present invention.

FIG. 2 shows a gas injector 1 according to a second exemplary embodiment of the present invention; identical or functionally identical parts have been provided with the same reference characters as in the first exemplary embodiment.

Differing from the first exemplary embodiment, gas injector 1 of the second exemplary embodiment additionally has another cooling ring 12. Cooling ring 12 is situated between valve body 6 and cylinder head 11. Here, cooling body 12 stands in direct contact on the one hand with the valve body 6 and on the other hand with cylinder head 11. Valve body 12 is made of a metallic material and has high thermal conductivity. In this way, heat can be transferred from valve body 6 immediately into cylinder head 11 via cooling ring 12. As a result, in particular a thermal loading of second seal seat 5 is also reduced, because the heat can be conducted away outward to cylinder head 11.

Figure 3:
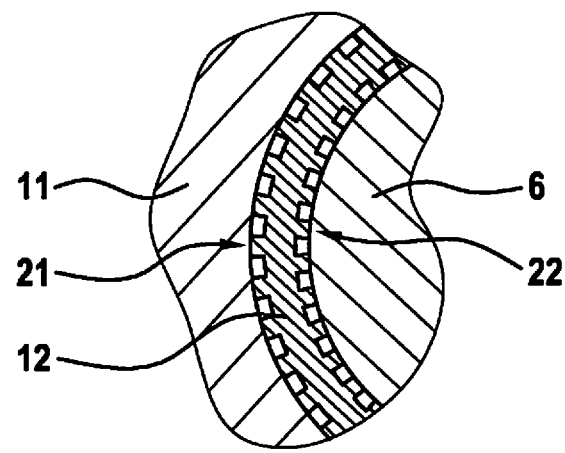
FIG. 3 shows a schematic partial sectional view of a cooling ring used in FIG. 2.

FIG. 3 shows, in section, cooling ring 12, which has a toothed profile 21, 22 on an outer circumference and inner circumference respectively. In this way, cooling ring 12 has the possibility of being easily deformable, so that in particular diameter tolerances on cylinder head 11 and/or on valve body 6 can be compensated.

Figure 4:
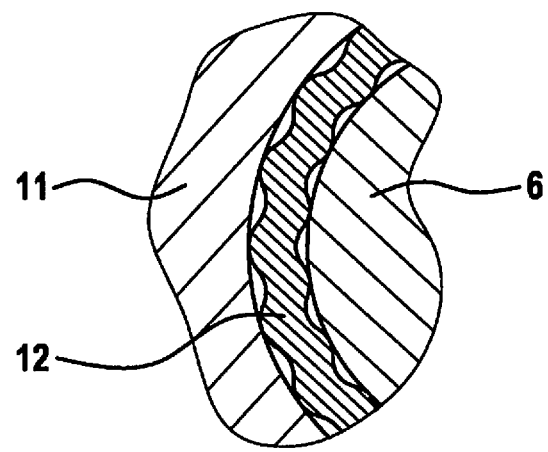
FIG. 4 shows a schematic partial sectional view of an alternative cooling ring.

FIG. 4 shows an alternative for cooling ring 12, cooling ring 12 shown in FIG. 4 being a wave spring that alternately lies against cylinder head 11 and valve body 6.

It is to be noted that cooling ring 12, independent of its geometric shape, as shown in FIGS. 3 and 4, has in each case slits in the axial direction, enabling easier mounting of gas injector 1 in cylinder head 11.

What is claimed is:

1. A gas injector for injecting a gaseous fuel directly into a combustion chamber of an internal combustion engine, comprising:
    a valve closing element for releasing and closing a through-opening;
    a first seal seat between the valve closing element and a valve body, the first seal seat being a metallic seal seat having two metallic sealing partners; and
    a second seal seat between a seat bearer fixedly connected to the valve closing element and a stationary component, the second seal seat including at least one elastomer seal as sealing partner, wherein the first seal seat is situated closer to the combustion chamber than is the second seal seat,
    wherein the at least one elastomer seal is situated in a groove of the seat bearer,
    wherein an annular space is disposed between the seat bearer and the valve body,
    wherein an innermost portion of the first seal seat is positioned radially closer to a center of the gas injector than an innermost portion of the second seal seat.

2. The gas injector as recited in claim 1, wherein the stationary component of the second seal seat is a guide component for guiding the valve closing element.

3. The gas injector as recited in claim 1, wherein a first diameter on the first seal seat is equal to or smaller than a second diameter on the second seal seat.

4. The gas injector as recited in claim 1, wherein the second seal seat is a flat seat.

5. The gas injector as recited in claim 1, wherein the first seal seat is a tapering seal seat.

6. The gas injector as recited in claim 1, wherein the first seal seat is a conical seal seat.

7. The gas injector as recited in claim 1, wherein the first seal seat forms a stop for the second seal seat.

8. The gas injector as recited in claim 1, further comprising:
   a cooling ring that is connected to the valve body and is set up to be in direct contact with a cylinder head.

9. The gas injector as recited in claim 8, wherein the cooling ring is made of a metallic material.

10. The gas injector as recited in claim 8, wherein the cooling ring has a toothed profile, on at least one of its inner circumference and/or on its outer circumference.

11. The gas injector as recited in claim 8, wherein the cooling ring is a wave spring.

12. The gas injector as recited in claim 8, wherein the cooling ring has slits in an axial direction of the gas injector.

13. An internal combustion engine, comprising:
a combustion chamber; and
a gas injector including a valve closing element for releasing and closing a through-opening, a first seal seat between the valve closing element and a valve body, the first seal seat being a metallic seal seat having two metallic sealing partners, and a second seal seat between a seat bearer fixedly connected to the valve closing element and a stationary component, the second seal seat including at least one elastomer seal as sealing partner, wherein the first seal seat is situated closer to the combustion chamber than is the second seal seat, wherein the at least one elastomer seal is situated in a groove of the seat bearer, the gas injector being situated immediately on the combustion chamber in order to inject gaseous fuel directly into the combustion chamber, wherein an annular space is disposed between the seat bearer and the valve body, wherein an innermost portion of the first seal seat is positioned radially closer to a center of the gas injector than an innermost portion of the second seal seat.

* * * * *